Figure 1:
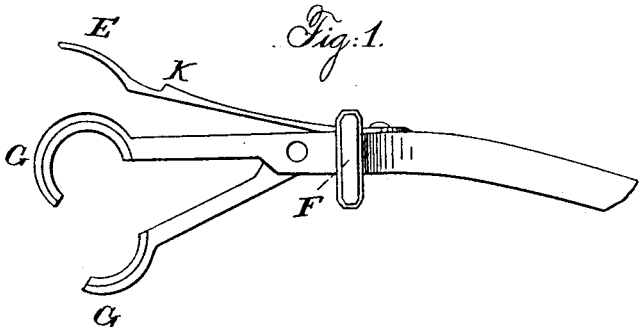
Figure 2:
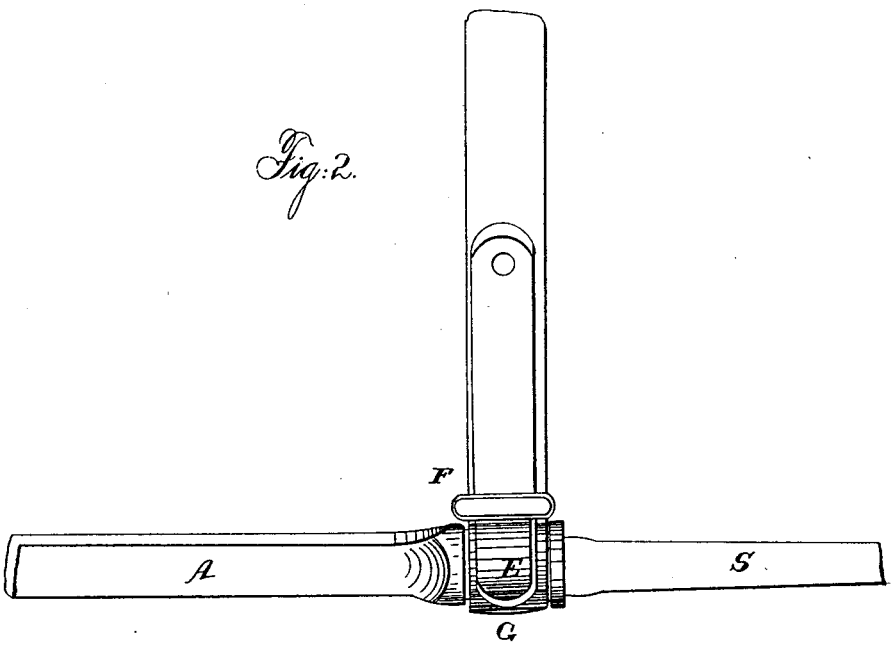
Figure 3:
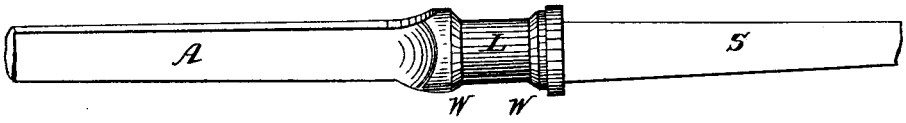

J. SADLER.

Thill-Coupling.

No. 308. A. I Patented Dec. 18, 1860.

Witnesses
Saml Spencer
G. D. Elliot

Inventor
James Sadler

N. PETERS, PHOTO-LITHOGRAPHER, WASHINGTON, D. C.

DEPARTMENT OF COMMERCE
UNITED STATES PATENT AND TRADEMARK OFFICE

---

MISSING PAGE(S)

PATENT NUMBER AI 308 FOR THE ISSUE DATE 12/18/1860 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text / Claims